United States Patent [19]

Otobe

[11] Patent Number: 4,638,658

[45] Date of Patent: Jan. 27, 1987

[54] METHOD OF DETECTING ABNORMALITY IN A SYSTEM FOR DETECTING EXHAUST GAS INGREDIENT CONCENTRATION OF AN INTERNAL COMBUSTION ENGINE

[75] Inventor: Yutaka Otobe, Shiki, Japan

[73] Assignee: Honda Giken Kogyo K.K., Tokyo, Japan

[21] Appl. No.: 776,466

[22] Filed: Sep. 16, 1985

[30] Foreign Application Priority Data

Sep. 19, 1984 [JP] Japan ................................ 59-194586

[51] Int. Cl.[4] ........................ G01M 15/00; F02M 7/00

[52] U.S. Cl. .................................... 73/117.3; 123/440

[58] Field of Search ................ 73/118, 117.3; 123/440

[56] References Cited

U.S. PATENT DOCUMENTS 4,254,744 3/1981 Mizote ............................... 73/117.3
4,364,359 12/1982 Otsuka et al. ....................... 123/440
4,542,728 9/1985 Otobe et al. ........................ 123/440
4,542,729 9/1985 Yamato et al. ...................... 123/440

*Primary Examiner*—Stewart J. Levy

*Assistant Examiner*—Robert R. Raevis

*Attorney, Agent, or Firm*—Arthur L. Lessler

[57] ABSTRACT

A method of detecting an abnormality in a system for detecting the concentration of an ingredient contained in exhaust gases emitted from an internal combustion engine, including a sensor for detecting the same concentration, wherein a correction value for the air-fuel ratio of a mixture being supplied to the engine is set in response to an output signal from the sensor, the correction value thus set being applied in detecting the abnormality. A first predetermined value and a second predetermined value smaller than the first predetermined value are set, which both lie within a first range defined by an upper limit value of the correction value and a lower limit value of same that can be assumed when the engine is in normal operating conditions. When the correction value continues to fall outside a second range defined by the first predetermined value and the second predetermined value over a limited period of time, it is determined that the system for detecting the exhaust gas ingredient concentration including the sensor is abnormal.

3 Claims, 10 Drawing Figures

METHOD OF DETECTING ABNORMALITY IN A SYSTEM FOR DETECTING EXHAUST GAS INGREDIENT CONCENTRATION OF AN INTERNAL COMBUSTION ENGINE

BACKGROUND OF THE INVENTION

This invention relates to a method of detecting abnormality in a system for detecting the concentration of an ingredient in the exhaust gases, including a sensor for detecting the same concentration, in a fuel supply control system of an internal combustion engine which is adapted to perform feedback control of the air-fuel ratio of an air-fuel mixture being supplied to the engine in response to an output signal from the sensor.

In order to control the air-fuel ratio of an air-fuel mixture being supplied to an internal combustion engine to a value within a desired range, a method is already known which is adapted to detect the concentration of a particular ingredient contained in exhaust gases emitted from the engine, e.g. the concentration of oxygen, determine the value of a correction coefficient for the air-fuel ratio in response to a detected value of the oxygen concentration, and correct the value of the air-fuel ratio by the use of the thus determined air-fuel ratio correction coefficient so that the value of the air-fuel ratio falls within the desired range.

An oxygen ($O_2$) sensor is widely employed as the means for detecting the oxygen concentration, which is composed of, for instance, solid electrolyte of zirconium ($ZrO_2$). This type $O_2$ sensor has such a characteristic that its electromotive force abruptly changes when the air-fuel ratio of the mixture lies in the vicinity of the theoretical mixture ratio. More specifically, it assumes a high level when the air-fuel ratio is richer (smaller) than the theoretical mixture ratio, and a low level when the air-fuel ratio is leaner (larger) than the theoretical mixture ratio. However, if an abnormality occurs in the system for detecting the exhaust gas ingredient concentration including the $O_2$ sensor having such characteristic, due to a disconnection in the wiring, degradation in the performance of the $O_2$ sensor per se, etc., it will be impossible to accurately control the air-fuel ratio of the mixture being supplied to the engine. Therefore, it is necessary to always monitor the operation of the $O_2$ sensor in order to obtain normal operation of the system for detecting the exhaust gas ingredient concentration.

A conventional method of detecting an abnormality in the system for detecting the exhaust gas ingredient concentration is known from Japanese Provisional Patent Publication (Kokai) No. 58-222939, as shown in FIG. 1, which shows a manner in which the value of the air-fuel ratio correction coefficient $KO_2$ is varied, which is set to a value obtained by adding thereto or subtracting therefrom a predetermined value each time the output voltage value of the $O_2$ sensor traverses a reference voltage value which corresponds to the desired air/fuel ratio (proportional term control), and thereafter it is set to a value obtained by adding thereto or subtracting therefrom a small fixed value each time a predetermined period of time elapses until the output value of the $O_2$ sensor is inverted again (integral term control).

According to this conventional abnormality-detecting method, the time interval is detected at which the value of the correction coefficient $KO_2$ is varied in a stepwise manner, i.e. the time interval (T1, T2, ... T5 in FIG. 1) at which it is inverted from a value to make the air-fuel ratio richer to a value to make the air-fuel ratio leaner, or vice versa. It is determined that the system is operating abnormally if the detected time interval exceeds a predetermined period of time TFS (for example, if the time interval T5 from t5 to t6 is larger than TFS). And the value of the correction coefficient $KO_2$ is set to a predetermined value at the fault detection (t6 in FIG. 1), thereby executing compensation for the abnormality in the system.

Another abnormality detecting method is known from Japanese Provisional Patent Publication (Kokai) No. 59-3137, which comprises detecting whether or not the value of the correction coefficient $KO_2$ falls within a range defined by an upper limit value $KO_2H$ and an lower limit value $KO_2L$ thereof, that can be assumed during normal operation of the engine, measuring the period of time which has elapsed from the time the value of the correction coefficient $KO_2$ fell outside the range, and determining that the system for detecting the $O_2$ concentration is abnormal if the measured period of time exceeds a predetermined period of time TFS'.

However, although these known methods are capable of detecting abnormalities resulting in a distinct change in the output characteristic of the $O_2$ sensor, such as caused by a disconnection in the wiring, they cannot detect abnormalities resulting in a gradual change in the sensor output characteristic. To be specific, let is now be assumed that values of the correction coefficient $KO_2$ obtained during a period B in FIG. 1 have been obtained under the same operating condition of the engine as those obtained during a preceding period A in FIG. 1, and a mean value KREF2 of the values of the correction coefficient $KO_2$ obtained during the period B is located on a richer side than a mean value KREF1 of the values of same obtained during the period A, so as to make the air-fuel ratio richer. If such phenomenon has actually been caused by a change in the output characteristic of the $O_2$ sensor due to degradation in the performance thereof, such change can badly affect the emission characteristic and fuel consumption of the engine. Therefore, such degradation in the performance of the $O_2$ sensor should desirably be detected as early as possible. However, according to the above conventional methods, abnormalities in the $O_2$ sensor cannot be detected until the output value of same falls outside its normal range, or until the time interval at which the output value of same has been inverted with respect to a predetermined value exceeds a predetermined period of time.

SUMMARY OF THE INVENTION

It is the object of the invention to provide a method of detecting an abnormality in a system for detecting the exhaust gas ingredient concentration of an internal combustion engine, which is capable of promptly detecting the abnormality, to thereby prevent the abnormality from badly affecting the emission characteristic and fuel consumption of the engine.

According to the present invention, there is provided a method of detecting an abnormality in a system for detecting the concentration of an ingredient contained in exhaust gases emitted from an internal combustion engine, the system including sensor means for detecting the exhaust gas ingredient concentration, wherein a correction value for the air-fuel ratio of a mixture being supplied to the engine is set in response to an output signal from the sensor means, and the air-fuel ratio of the mixture is controlled in response to the correction value thus set, the correction value being applied in detecting the abnormality.

The method according to the invention is characterized by comprising the following steps: (1) setting a first predetermined value and a second predetermined value smaller than the first predetermined value which both lie within a first range defined by an upper limit value of the correction value and a lower limit value of same that can be assumed when the engine is in normal operating conditions; (2) determining whether or not the correction value continues to fall outside a second range defined by the first predetermined value and the second predetermined value over a limited period of time; and (3) judging that the system for detecting the exhaust gas ingredient concentration including the sensor means is abnormal if it is determined that the correction value continues to fall outside the second range over the limited period of time at the step (2).

Preferably, the limited period of time is set as a function of the rotational speed of the engine.

Preferably, pulses of a signal generated at predetermined crank angles of the engine are detected, and it is determined that the limited period of time has elapsed when generation of a predetermined number of the pulses has been detected.

The above and other objects, features and advantages of the invention will be more apparent from the ensuing detailed description taken in conjunction with the accompanying drawings.

DETAILED DESCRIPTION

The method according to the invention will now be described in detail with reference to the drawings.

Figure 2:
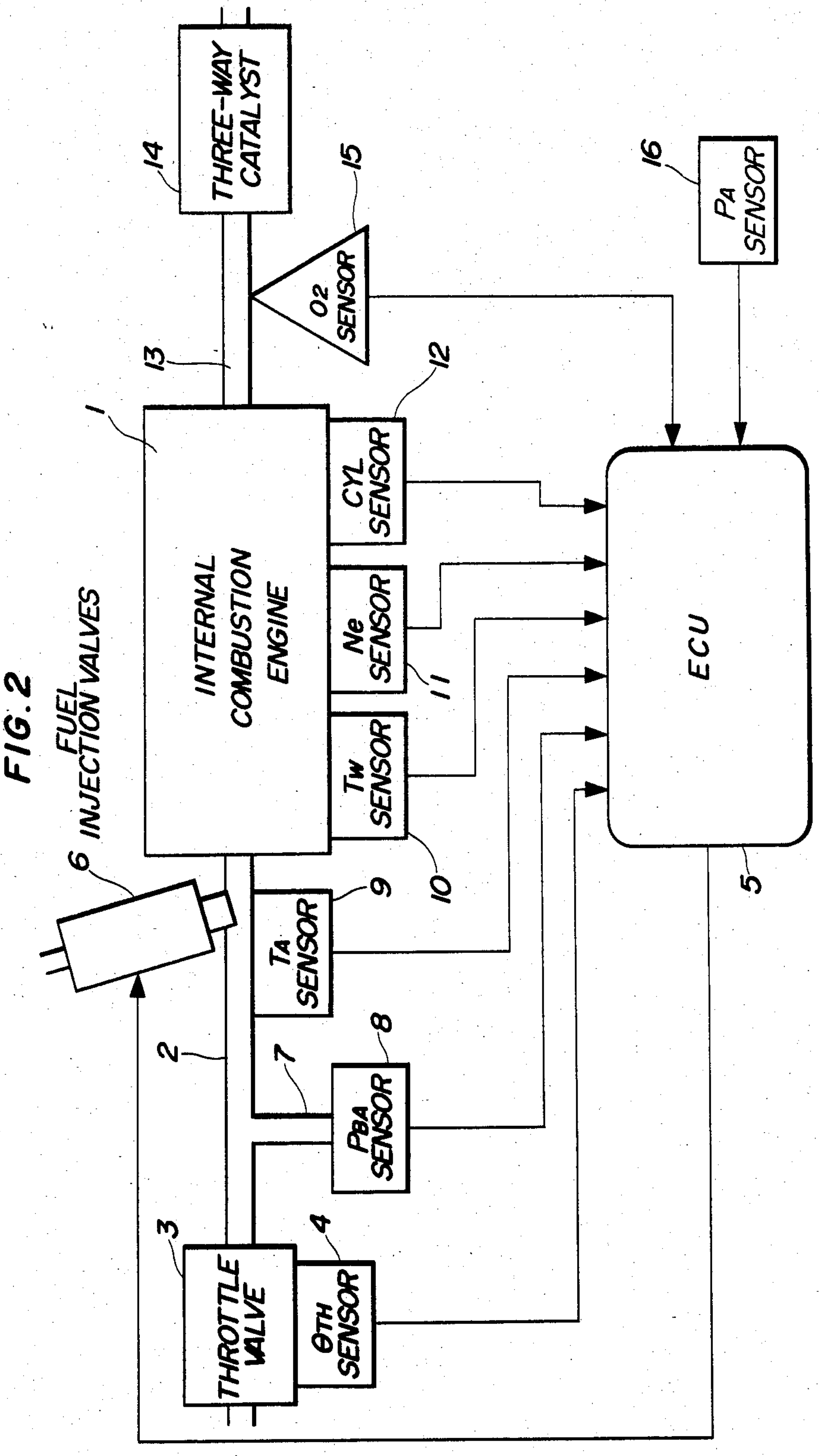
FIG. 2 is a block diagram illustrating the whole arrangement of a fuel supply control system of an internal combustion engine, to which is applicable the method according to the invention.

Referring first to FIG. 2, there is illustrated the whole arrangement of a fuel supply control system of an internal combustion engine, to which the method according to the present invention is applicable. Reference numeral 1 designates an internal combustion engine which may be a four-cylinder type, for instance, and to which is connected an intake passage 2 with a throttle valve 3 arranged therein. A throttle valve opening (θth) sensor 4 is connected to the throttle valve 3 for detecting its valve opening and is electrically connected to an electronic control unit (hereinafter called "the ECU") 5, to supply same with an electrical signal indicative of throttle valve opening θth detected thereby. The ECU 5 operates to calculate the desired air-fuel ratio of a mixture being supplied to the engine 1, etc., as well as to detect an abnormality in a system for detecting the exhaust gas ingredient concentration, in a manner hereinafter described.

Fuel injection values 6 are each arranged in the intake passage 2 at a location slightly upstream of an intake valve of a corresponding one of the engine cylinders, not shown, and between the engine 1 and the throttle valve, for supply of fuel to the corresponding engine cylinder. Each of the fuel injection valves 6 is connected to a fuel pump, not shown, and is electrically connected to the ECU 5, in a manner having their valve opening periods or fuel injection quantities controlled by signals supplied from the ECU 5.

On the other hand, an absolute pressure (PBA) sensor 8 communicates through a conduit 7 with the interior of the intake passage 2 at a location downstream of the throttle valve 3. The absolute pressure sensor 8 is adapted to detect absolute pressure PBA in the intake passage 2 and applies an electrical signal indicative of detected absolute pressure PBA to the ECU 5. An intake air temperature (TA) sensor 9 is arranged in the intake passage 2 at a location downstream of the conduit 7 and also electrically connected to the ECU 5 for supplying same with an electrical signal indicative of detected intake air temperature TA.

An engine cooling water temperature (TW) sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm (Ne) sensor 11 and a cylinder-discriminating (CYL) sensor 12 are arranged on a camshaft, not shown, of the engine 1 or a crankshaft of same, not shown. The former 11 is adapted to generate one pulse at a particular crank angle each time the engine crankshaft rotates through 180 degrees, i.e., each pulse of the top-dead-center position (TDC) signal, while the latter 12 is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the cylinder block of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen contained in the exhaust gases and supplying an electrical signal indicative of a detected concentration value to the ECU 5.

Further connected to the ECU 5 is, for instance, an atmospheric pressure (PA) sensor 16 for detecting atmospheric pressure and supplying an electrical signal indicative of detected atmospheric pressure to the ECU 5.

The ECU 5 operates on the basis of various engine parameter signals inputted thereto to determine engine operating conditions as well as to calculate the value opening period TOUT of the fuel injection valves 6 in response to the determined engine operating conditions by means of the following equation:

$$TOUT = Ti \times KO_2 \times K_1 + K_2 \ldots \quad (1)$$

wherein Ti represents a basic value of the fuel injection period for the fuel injection valves 6 and is calculated as a function of the engine rotational speed Ne detected by the Ne sensor 11 and the intake passage absolute pressure PBA detected by the PBA sensor 8, and $KO_2$ represents an air-fuel ratio correction coefficient. When feedback control of the air-fuel ratio is effected, the value of the air-fuel ratio correction coefficient $KO_2$ is set in response to the oxygen concentration indicated by the output signal of the $O_2$ sensor 15 and is calculated in a manner shown in FIG. 4, hereinafter described, while when open loop control of the air-fuel ratio is effected, it is set to a mean value KREF of values thereof applied during the feedback control of the air-fuel ratio.

Further in the equation (1), $K_1$ and $K_2$ represent correction coefficients and correction variables having values dependent upon the values of output signals from the aforementioned various sensors, that is, the throttle valve opening sensor 4, the intake passage absolute pressure sensor 8, the intake air temperature sensor 9, the engine cooling water temperature sensor 10, the Ne sensor 11, the cylinder-discriminating sensor 12, the $O_2$ sensor 15, the atmospheric pressure sensor 16, etc., and are calculated so as to optimize the startability, emission characteristics, fuel consumption, accelerability, etc. of the engine.

The ECU 5 supplies driving signals to the fuel injection valves 6 to open same for a period of time corresponding to the valve opening period TOUT calculated by means of the equation (1).

Figure 3:
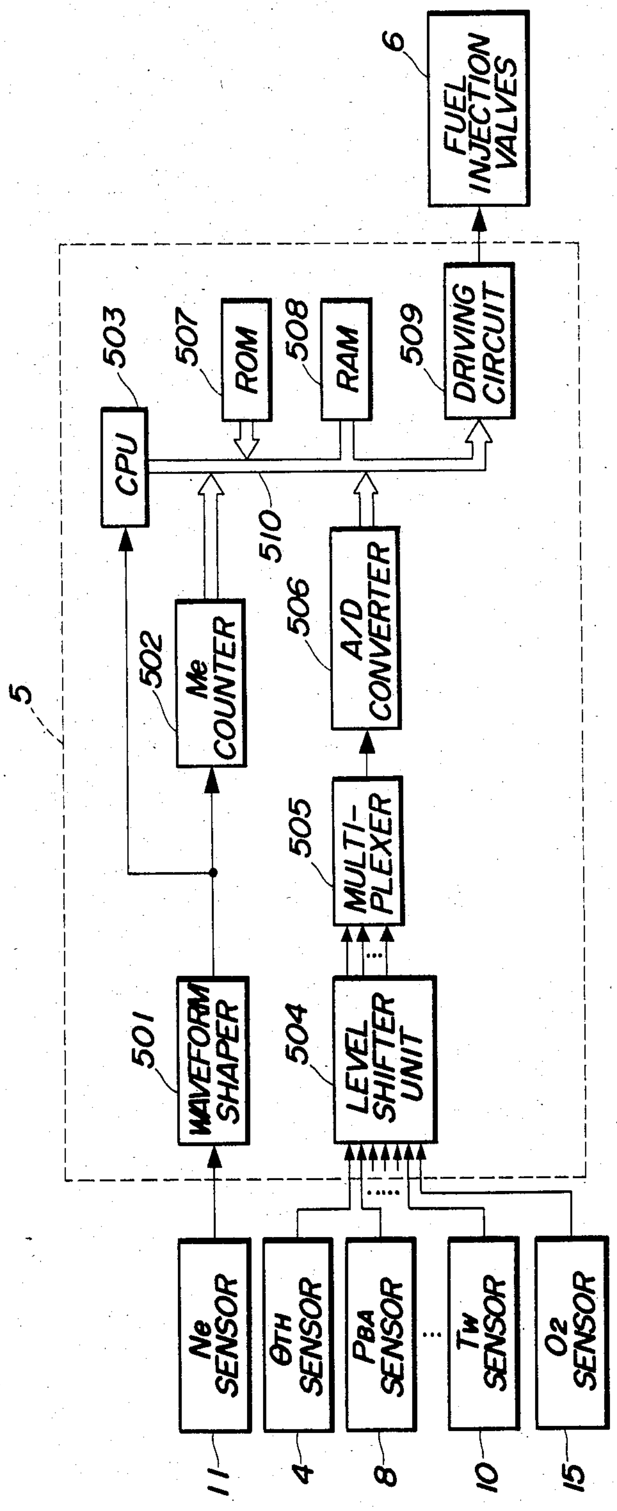
FIG. 3 is a circuit diagram showing an electrical circuit within the electronic control unit (ECU) in FIG. 2.

FIG. 3 shows an electrical circuit within the ECU 5 in FIG. 2. The engine rotational speed (rpm) signal from the Ne sensor 11 in FIG. 2 is applied to a waveform shaper 501, wherein it has its waveform shaped, and the shaped signal is supplied to a central processing unit (hereinafter called "the CPU") 503 as the TDC signal as well as to a Me counter 502. The Me counter 502 counts the interval of time between a preceding pulse of the engine rpm signal from the Ne sensor 11 and a present pulse of the same signal, and accordingly its counted value Me is proportional to the reciprocal of the actual engine rpm Ne. The Me counter 502 supplies the counted value Me to the CPU 503 via a data bus 510.

The respective output signals from the throttle valve opening sensor 4, the intake passage absolute pressure sensor 8, the engine cooling water temperature sensor 10, the $O_2$ sensor 15, and other sensors, all appearing in FIG. 2, have their voltage levels shifted to a predetermined voltage level by a level shifter unit 504 and successively applied to an analog-to-digital converter 506 through a multiplexer 505. The A/D converter 506 successively converts the above signals into digital signals and supplies them to the CPU 503 via the data bus 510.

The CPU 503 is also connected to a read-only memory (hereinafter called "the ROM") 507, a random access memory (hereinafter called "the RAM") 508, and a driving circuit 509, through the data bus 510. The ROM 507 stores various programs including a program for detecting an abnormality in the system for detecting the $O_2$ concentration, which is executed by the CPU 503 in a manner hereinafter described, as well as various data and tables or maps including a table of basic values Ti of fuel injection period, and a table of reference values $KO_2FSH$ and $KO_2FSL$ which are applied in determining whether or not the correction coefficient $KO_2$ has an abnormal value, etc. The RAM 508 temporarily stores the resultant values of various calculations from the CPU 503, as well as data supplied from the Me counter 502 and the A/D converter 506. The driving circuit 509 supplies driving signals corresponding to the TOUT value calculated by means of the equation (1) to the fuel injection valves 6 to open same for a period of time corresponding to the calculated TOUT value.

Figure 4B:
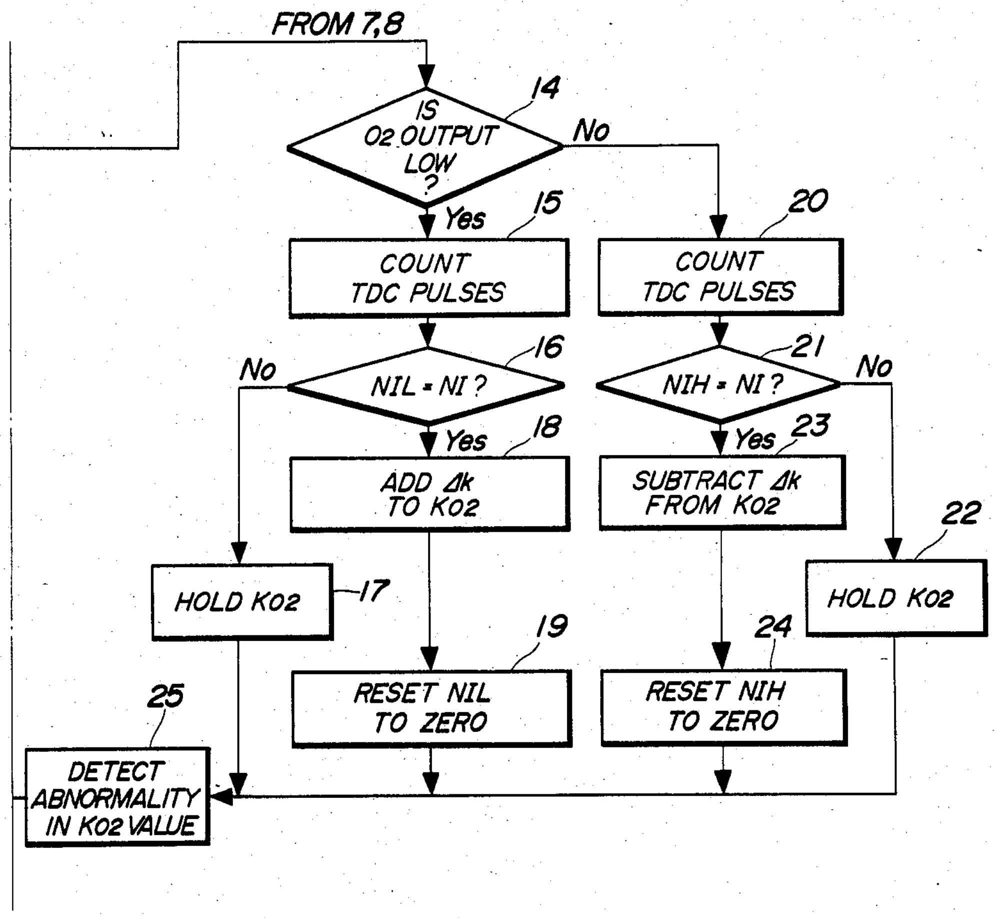
FIG. 4 (and FIGS. 4A, 4B) is a flow chart showing a manner of calculating the value of the air-fuel ratio correction coefficient $KO_2$.
Figure 4:
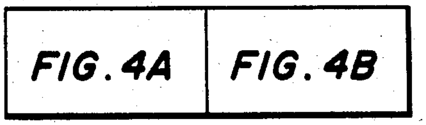
Figure 4A:
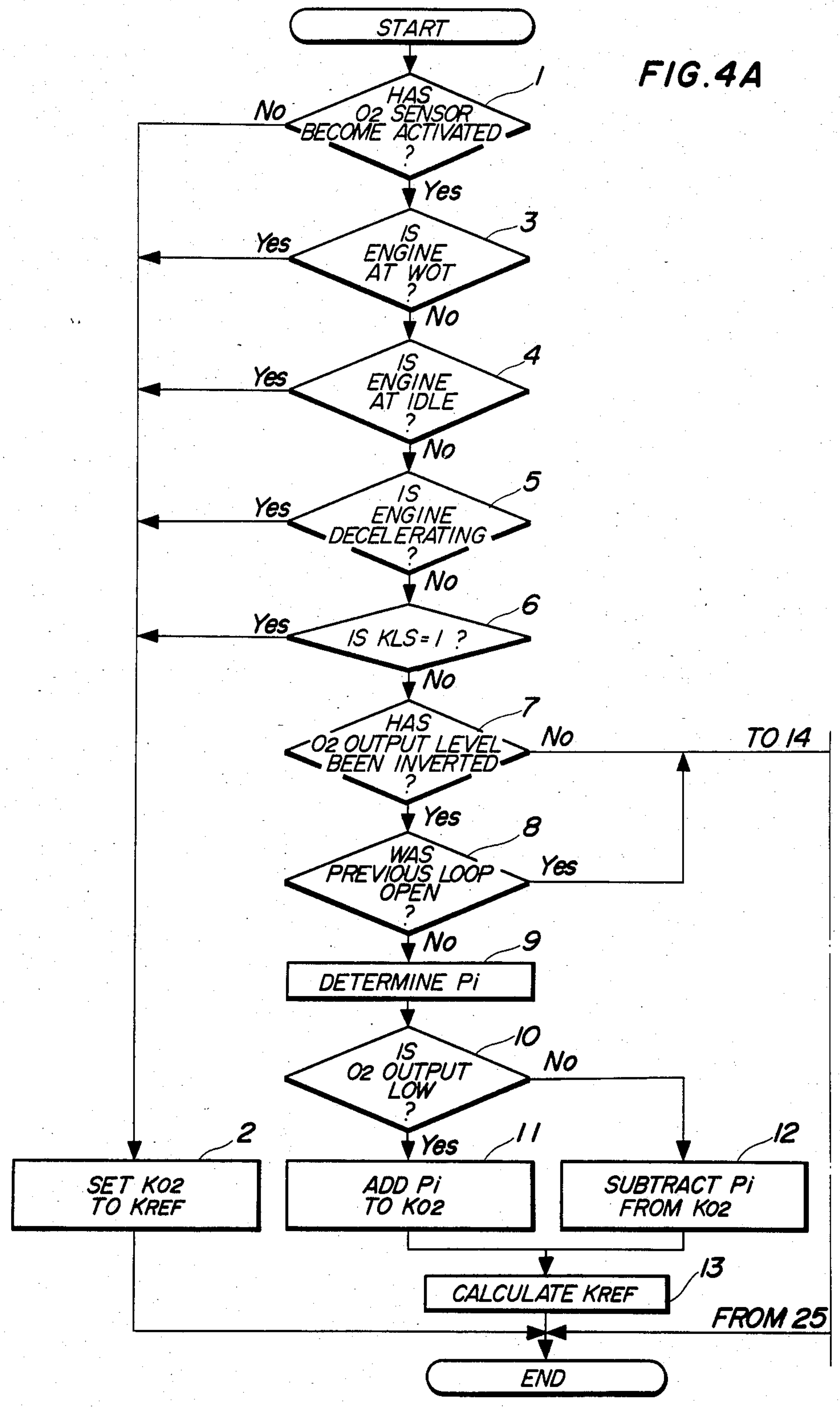

FIG. 4 is a flow chart showing a program for calculating the value of the air-fuel ratio correction coefficient $KO_2$, which is executed within the CPU 503 in synchronism with generation of the TDC signal pulses.

First, a determination is made as to whether or not the $O_2$ sensor 15 has become activated, at the step 1. More specifically, at the step 1 it is detected whether or not the output voltage of the $O_2$ sensor has dropped to an initial activation point VX (e.g. 0.6 volt) then it is also detected whether or not a predetermined period of time (e.g. 60 seconds) has elapsed after the point VX was reached. If the activation of the $O_2$ sensor 15 is negated at the step 1, the value of the correction coefficient $KO_2$ is set to a mean value KREF, referred to later, at the step 2. When the $O_2$ sensor 15 is found to be activated, a determination is made as to whether or not the throttle valve 3 is fully opened (WOT), at the step 3. If the answer is yes, the value of $KO_2$ is also set to the above mean value KREF at the step 2. If the throttle valve is not fully opened, whether or not the engine is at idle is determined at the step 4. To be concrete, if the engine rpm Ne is smaller than a predetermined value NLDL (e.g. 1000 rpm) and the intake passage absolute pressure PBA is lower than a predetermined value PBIDL (e.g. 360 mmHg), the engine is judged to be idling, and then the above step 2 is executed to set the $KO_2$ value to the value KREF. If the engine is not found to be idling, whether or not the engine is decelerating is determined at the step 5. To be concrete, it is judged that the engine is decelerating, when the absolute pressure PBA is lower than a predetermined value PBDEC (e.g. 200 mmHg), or when a fuel cut effecting condition is satisfied. If the answer to step 1 is no, or the answer to any of steps 1 to 5 is yes, the value of $KO_2$ is held at the above value KREF, at the step 2. On the other hand, if it is determined that the engine is not decelerating, it is determined at step 6 whether or not a mixture leaning coefficient KLS applicable in a predetermined mixture-leaning region then has a value of 1.0. If the answer is yes, the $KO_2$ value is also held at the above value KREF at the step 2, while if the answer is no, the program proceeds to the step 7 et seq. which will be described below.

The step 7 et seq. are executed when the engine is operating in a region wherein feedback control of the air-fuel ratio based on the $O_2$ sensor output signal should be effected. It is first determined whether or not the output voltage value of the $O_2$ sensor has traversed the reference voltage value which corresponds to the desired air/fuel ratio, at the step 7. If the answer is affirmative, whether or not the previous loop was an open loop is determined at the step 8. If it has been determined that the previous loop was not an open loop, the program proceeds to the step 9 to determine a correction amount Pi by which the coefficient $KO_2$ is corrected. To be specific, Pi is applied to the correction coefficient KO2 each time the output voltage value from the $O_2$ sensor 15 changes from Low (lean) to High (rich) or from High (rich) to Low (lean) with respect to the reference voltage value corresponding to the stoichiometric air/fuel ratio.

Figure 5:
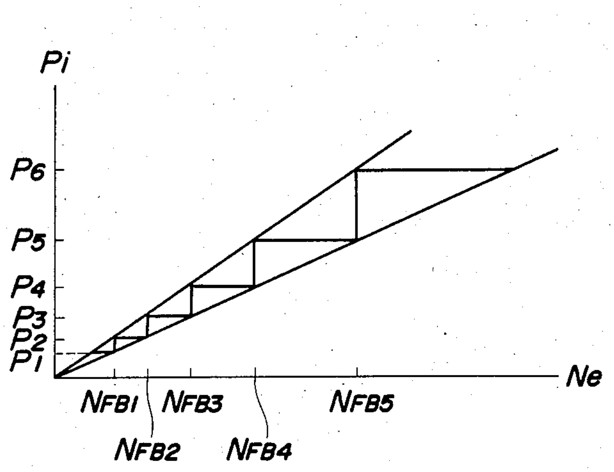
FIG. 5 is a view of a table illustrating the relationship between a correction amount Pi applied in proportional term control of the value of the air-fuel ratio correction coefficient $KO_2$ and the rotational speed Ne of the engine.

More specifically, referring to FIG. 5 showing a Pi table illustrating the relationship between the correction amount Pi and the engine rpm Ne, which is stored in the ROM 507 in FIG. 3, five different predetermined Ne values NFB1–NFB5 are provided which have values falling within a range from 1500 rpm to 3500 rpm, while five different predetermined Pi values P1–P6 are provided in relation to the above Ne values, by way of example. Thus, the value of correction amount Pi is determined from the engine rpm Ne at the step 9.

Then, whether or not the output level of the $O_2$ sensor is low with respect to the stoichiometric air/fuel ratio value (14.7) is determined at the step 10. If the answer is yes, the Pi value obtained from the table of FIG. 5 is added to the coefficient $KO_2$, at the step 11, while if the answer is no, the former is subtracted from the latter at the step 12. Then, a mean value KREF is calculated from the value of $KO_2$ thus obtained, at the step 13. Calculation of the mean value KREF is made by the use of the following equation:

$$KREF = \frac{CREF}{A} \times KO_{2}p + \frac{A - CREF}{A} \times KREF \quad (2)$$

where $KO_2p$ represents a value of $KO_2$ obtained immediately before or immediately after a proportional term (P-term) control action, A a constant determined by the memory capacity of an 8-bit computer used as the ECU 5, CREF a variable which is set within a range from 1 to $A-1$, A and CREF determining the rate at which KREF is updated and KREF' a mean value of values $KO_2$ obtained from the start of the first operation of an associated control circuit to the last proportional term control action inclusive. The means value KREF thus calculated remains stored in the RAM 508 even during stoppage of the engine 1.

Since the value of the variable CREF determines the ratio of the value $KO_2p$ obtained at each P-term control action, to the value KREF, value of KREF which will provide a desired performance characteristic for a particular engine can be obtained by setting the value CREF to a suitable value within the range from 1 to $A-1$ depending upon the specifications of an air-fuel ratio control system, an engine, etc. to which the invention is applied.

As noted above, the value KREF is calculated on the basis of a value $KO_2p$ obtained immediately before or immediately after each P-term control action. This is because an air-fuel ratio of the mixture being supplied to the engine occurring immediately before or immediately after a P-term control action, that is, at an instant of inversion of the output level of the $O_2$ sensor shows a value most close to the theoretical mixture ratio (14.7). Thus, a mean value of $KO_2$ values can be obtained which are each calculated at an instant when the actual air-fuel ratio of the mixture shows a value most close to the theoretical mixture ratio, thus making it possible to calculate a value KREF most appropriate to the actual operating condition of the engine.

Figure 6:
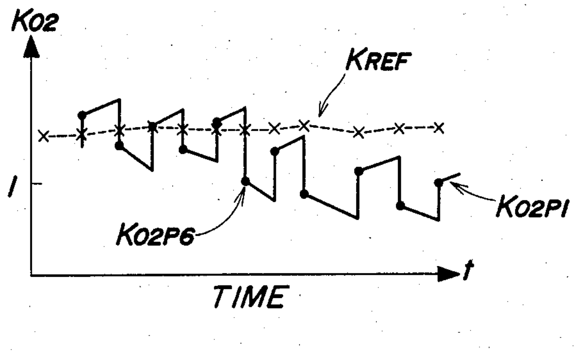
FIG. 6 is a graph showing a manner in which is vaired the value of the air-fuel ratio correction coefficient $KO_2$ as well as a mean value KREF thereof.

FIG. 6 is a graph showing a manner of detecting (calculating) the value $KO_2p$ detected immediately after a P-term control action. In FIG. 6, the mark.indicates a value $KO_2p$ detected immediately after a P-term control action, and $KO_2p1$ is an up-to-date value detected at the present time, while $KO_2p6$ is a value detected immediately after a P-term control action which is a sixth action from the present time.

The mean value KREF can also be calculated from the following equation:

$$KREF = \frac{1}{B} \sum_{j=1}^{B} KO_{2}pj \quad (3)$$

where $KO_2pj$ represents a value of $KO_2P$ obtained immediately before or immediately after a first one of a j-number of P-term control actions which take place before the present one, and B a constant which is equal to a predetermined number of P-term control actions (a predetermined number of inversions of the $O_2$ output) subjected to calculation of the mean value. The larger the value of B, the larger the ratio of each value $KO_2p$ to the value KREF. The value of B is set at a suitable value depending upon the specifications of an air-fuel ratio feedback control system, an engine, etc. to which the invention is applied. According to the equation (3), calculation is made of the sum of the values of $KO_2pj$ from the P-term control action taking place B times before the present P-term control action to the present P-term control action, each time a value of $KO_2pj$ is obtained, and the mean value of these values of $KO_2pj$ forming the sum is calculated.

Further, according to the above equations (2) and (3), the mean value KREF is renewed each time a new value of $KO_2p$ is obtained during feedback control based upon the $O_2$ sensor output, by applying the above new value of $KO_2p$ to the equations. Thus, the value KREF obtained always fully represents the actual operating condition of the engine. The mean value KREF calculated as described above is used, together with the other correction coefficients K1, K2, for control of the air-fuel ratio of the mixture. The correction coefficients K1, K2 are applied during an open loop control operation immediately following the feedback control operation based upon the $O_2$ sensor output in which the same value KREF has been calculated. The open loop control operation is carried out in particular engine operating regions such as an engine idle region, a mixture leaning region, a wide-open-throttle operating region, and a decelerating region.

Reverting now to FIG. 4, if the answer to the question of the step 7 is no, that is, if the $O_2$ sensor output level remains at the same level, or if the answer to the question of the step 8 is yes, that is, if the previous loop was an open loop, the air-fuel ratio of the mixture is controlled by integral term control (I-term control). More specifically, whether or not the $O_2$ sensor output level is low is determined at the step 14. If the answer is yes, TDC signal pulses are counted at the step 15, accompanied by determining whether or not the count NIL has reached a predetermined value NI (e.g. 30 pulses), at the step 16. If the predetermined value NI has not yet been reached, the $KO_2$ value is held at its immediately preceding value, at the step 17. If the value NIL is found to have reached the value NI, a predetermined value $\Delta k$ (e.g. about 0.3% of the $KO_2$ value) is added to the $KO_2$ value, at the step 18. At the same time, the number of pulses NIL so far counted is reset to zero at the step 19. After this, the predetermined value $\Delta k$ is added to the $KO_2$ value each time the value NIL reaches the value NI. On the other hand, if the answer to the question of the step 14 is found to be no, TDC pulses are counted at the step 20, accompanied by determining whether or not the count NIH has reached the predetermined value NI at the step 21. If the answer is no at the step 21, the $KO_2$ value is held at its immediately preceding value, at the step 22, while if the answer is yes, the predetermined value $\Delta k$ is subtracted from the $KO_2$ valve, at the step 23, and simultaneously the number of pulses NIH so far counted is reset to zero at the step 24. Then, the predetermined value $\Delta k$ is subtracted from the $KO_2$ value each time the value NIH reaches the value NI in the same manner as mentioned above. After execution of the step 17, 19, 22, or 24, the program proceeds to the step 25 at which is executed a subroutine for detecting an abnormality in the system for detecting the oxygen concentration according to the present invention, as described below.

Figure 1:
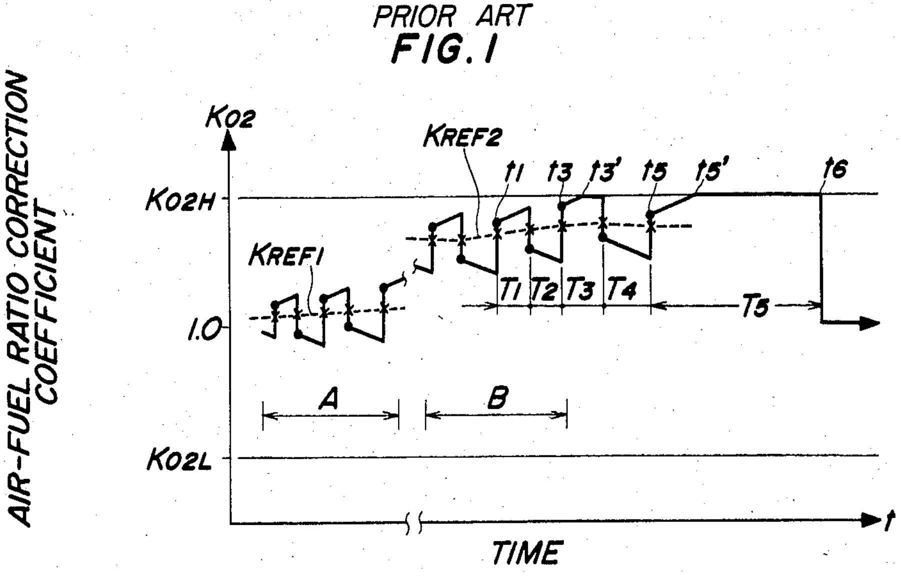
PRIOR ART FIG. 1
FIG. 1 is a graph illustrating a manner in which is varied the value of an air-fuel ratio correction coefficient $KO_2$, which is useful in explaining a conventional method of detecting an abnormality in a system for detecting the oxygen concentration.
Figure 8:
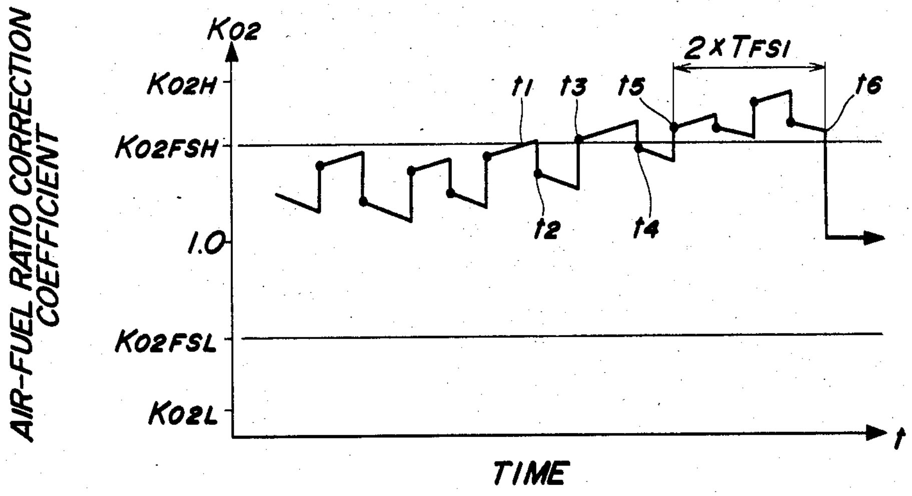
FIG. 8 is a graph showing a manner in which is varied the value of the air-fuel ratio correction coefficient $KO_2$ which is applied in detecting the abnormality according to the method of the invention.
Figure 7:
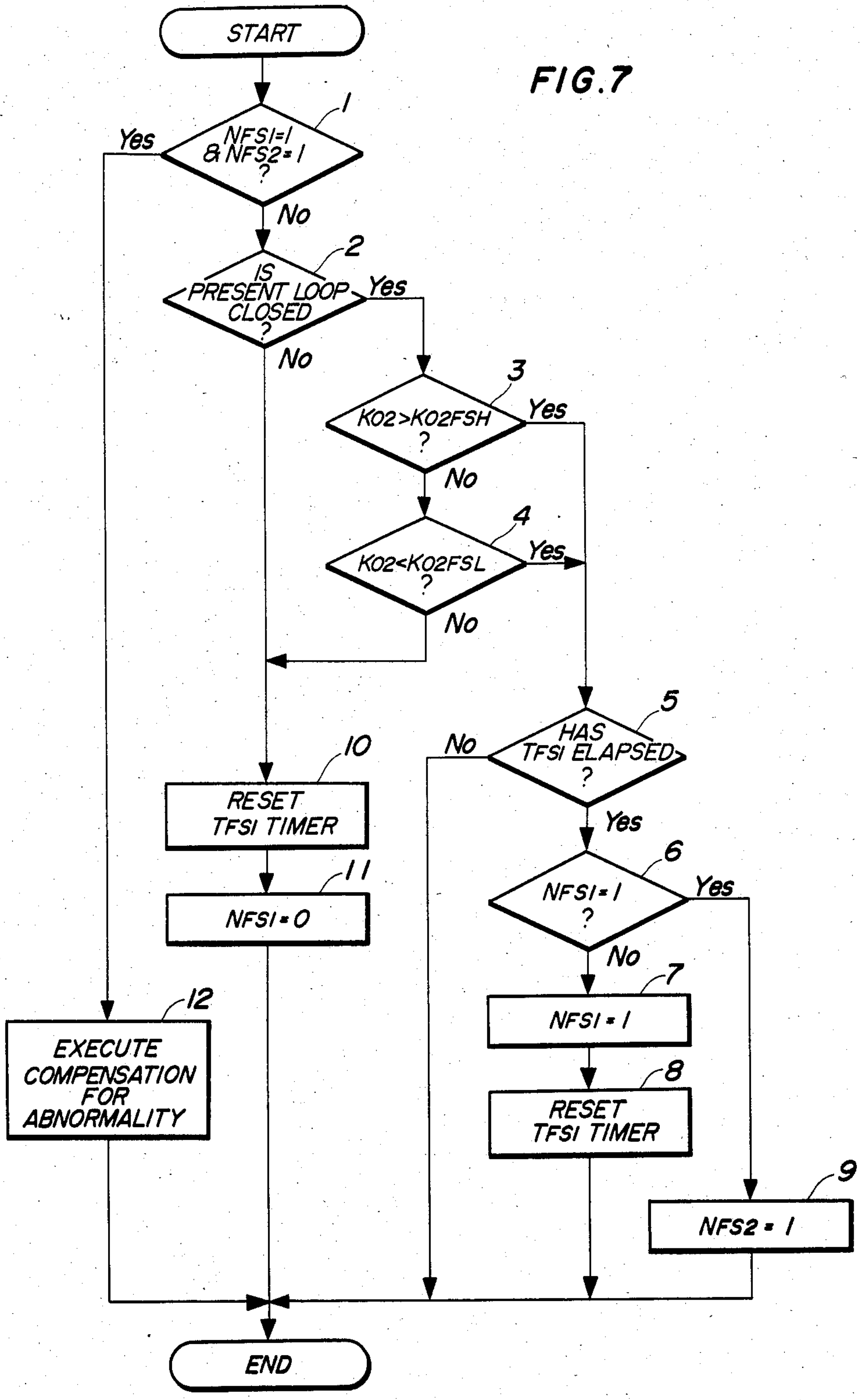
FIG. 7 is a flow chart showing a manner of detecting an abnormality in a system for detecting the oxygen concentration according to the method of the invention.

FIG. 7 is a flow chart showing the subroutine for detecting the abnormality according to the method of the present invention. First, at the step 1, it is determined whether or not a first flag NFS1 for failure determination and a second flag NFS2 for same are both equal to a value "1". If the answer to the question of the step 1 is negative, the program proceeds to the step 2 wherein it is determined whether or not feedback control the air-fuel ratio based on the $O_2$ sensor output signal is effected in the present loop. If the answer is negative, that is, if the $O_2$ feedback control of the air-fuel ratio is not effected in the present loop, the step 10 is executed to reset a TFS1 timer, hereinafter referred to. Then, the step 11 is executed to clear the value of the first flag NFS1, followed by termination of execution of the program. On the other hand, if $O_2$ feedback control of the air-fuel ratio is effected in the present loop, the steps 3 and 4 are executed to determine whether or not the value of the correction coefficient $KO_2$ is abnormal. That is, at the step 3, it is determined whether or not the $KO_2$ value is larger than a first predetermined value $KO_2FSH$ which is larger than 1.0 (e.g. $KO_2FSH=1.4$), while it is determined at the step 4 whether or not the $KO_2$ value is smaller than a second predetermined valve $KO_2FSL$ which is smaller than 1.0 (e.g. $KO_2FSL=0.8$). The first predetermined value $KO_2FSH$ and the second predetermined value $KO_2FSL$ are reference values for determining abnormality of the $KO_2$ value, and are set, as shown in FIG. 8, so as to lie within a range which is defined by an upper limit value $KO_2H$, e.g. 1.6, of the $KO_2$ value and a lower limit value $KO_2L$, e.g. 0.6, of same (the central value is 1.0) that can be assumed during normal operation of the engine while the $O_2$ feedback control of the air-fuel ratio is effected. The first predetermined value $KO_2FSH$ is set at a value smaller than the upper limit value $KO_2H$ at least by the correction amount Pi, while the second predetermined valure $KO_2FSL$ is set at a value larger than the lower limit value $KO_2L$ at least by the correction amount Pi.

If both of the steps 3 and 4 render a negative answer, that is, if the value of the correction coefficient $KO_2$ falls within a normal range (before t1, t2–t3, and t4–t5 in FIG. 8), the above stated steps 10 and 11 are executed, followed by termination of execution of the program. On the other hand, either of the steps 3 and 4 renders an affirmative answer, that is, if the $KO_2$ value falls outside the normal range (t1–t2, t3–t4, and t5–t6 in FIG. 8), the program proceeds to the step 5 wherein it is determined whether or not a limited period of time TFS1 has elapsed since the $KO_2$ value fell outside the normal range. If the answer to the question of the step 5 is negative, it is judged that the value of the correction coefficient $KO_2$ merely temporarily became abnormal (t1–t2, and t3–t4 in FIG. 8), to terminate execution of the program. On the other hand, if the answer to the question to step 5 is affirmative, that is, if the $KO_2$ value continues to fall outside the normal range over the limited period of time TFS1, the step 6 is executed.

At the step 6, it is determined whether or not the first flag NFS1 for failure determination is equal to the value "1". If a negative answer is rendered, the step 7 is executed to set the value of the first flag NFS1 to the value "1". Then, at the step 8, the TFS1 timer is restarted, followed by termination of execution of the program. The TFS1 timer is, for instance, composed of a program timer for counting pulses of the TDC signal, which is adapted to determine that the limited period of time TFS1 has elapsed when it has counted up 2000 pulses of the TDC signal. Thus, the length of the limited period of time TFS1 is decreased in proportion to increase of the engine rotational speed Ne, so as to make the length of the limited period of time TFS1 appropriate for operating conditions of the engine. On the other hand, if the step 6 renders an affirmative answer, that is, if the first flag NFS1 has the value "1", the step 9 is executed to set the second flag NFS2 to the value "1", followed by termination of present execution of the program. In the next execution of the program in synchronism with generation of a subsequent pulse of the TDC signal, the step 1 will render an affirmative answer, thereby definitely determining abnormality in the $KO_2$ value. Then, the program proceeds to the step 12 wherein compensation operation for an abnormality thus detected in the system for detecting the oxygen concentration is executed (t6 in FIG. 8). In the above manner, an abnormality in the system for detecting the oxygen concentration is definitely determined when the first flag NFS1 and the second flag NFS2 for failure determination are both equal to the value "1", so as to avoid making a wrong diagnosis that an abnormality as occurred in the system for detecting the oxygen concentration, even in the event that one of the flags NFS1 and NFS2 is erroneously set to the value "1" due to external noise or the like, thereby enabling accurate detection of an abnormality.

The compensation operation for a detected abnormality in the system for detecting oxygen concentration may comprise, for example, setting the value of the correction coefficient $KO_2$ to 1.0 or to the mean value KREF (after t6 in FIG. 8), and applying a control signal from the CPU 503 (in FIG. 3) to an alarm device, not shown, to actuate same. Once the step 12 is executed, the execution of the compensation operation is continued just before repair of related parts of the system is completed to restore normal operation thereof.

Incidentally, although in the foregoing embodiment, the TFS1 timer employed in the abnormality detection shown in the flow chart of FIG. 7 is composed of a program timer for counting TDC signal pulses, it may be alternatively composed of a timer for counting clock pulses generated by a clock pulse generator usually provided in the CPU 503, which is employed in detecting the duration of an abnormal value of the correction coefficient $KO_2$, so as to determine abnormality in the system for detecting the oxygen concentration when a limited period of time TFS1 has elapsed. In the alternative case, the limited period of time TFS1 should preferably be set to values decreasing as the rotational speed Ne of the engine increases.

What is claimed is:

1. A method of detecting an abnormality in a system for detecting the concentration of an ingredient contained in exhaust gases emitted from an internal combustion engine, said system including sensor means for detecting the exhaust gas ingredient concentration, wherein a correction value for the air-fuel ratio of a mixture being supplied to said engine is set in response to an output signal from said sensor means, and the air-fuel ratio of said mixture is controlled in response to said correction value thus set, said correction value being applied in detecting said abnormality, the method comprising the steps of:

(1) setting a first predetermined value and a second predetermined value smaller than said first predetermined value, which values both lie within a first range defined by (i) an upper limit value of said correction value which is larger than said first predetermined value and (ii) a lower limit value of said correction value which is smaller than said second predetermined value, said upper limit value and said lower limit value being extreme values that can be assumed while said sensor means is functioning normally when said engine is in normal operating conditions;

(2) determining whether or not said correction value has continually been lying outside a second range defined by said first predetermined value and said second predetermined value over a limited period of time, said first range and said limited period of time being set at such values as to detect a change in output characteristics of said sensor means due to degradation in performance thereof; and (3) providing a signal indicating that said system for detecting the exhaust gas ingredient concentration including said sensor means is abnormal if it is determined that said correction value has continually been lying outside said second range over said limited period of time at said step (2).

2. A method as claimed in claim 1, including the step of setting said limited period of time as a function of the rotational speed of said engine.

3. A method as claimed in claim 2, including the steps of detecting pulses of a signal generated at predetermined crank angles of said engine, and determining that said limited period of time has elapsed when generation of a predetermined number of said pulses has been detected.

* * * * *